United States Patent [19]

Watkins

[11] 4,226,326
[45] Oct. 7, 1980

[54] CONVEYOR TROUGH AND PULL ROD FOR A SHAKER CONVEYOR

[75] Inventor: Charles L. Watkins, Chicago, Ill.

[73] Assignee: Goodman Equipment Corporation, Chicago, Ill.

[21] Appl. No.: 918,965

[22] Filed: Jun. 26, 1978

[51] Int. Cl.³ .............................................. B65G 27/06
[52] U.S. Cl. ...................................... 198/758; 74/584; 198/766
[58] Field of Search ............... 198/758, 609, 595, 766, 198/855; 209/365 R, 365 A, 365 B; 74/584, 585

[56] References Cited

U.S. PATENT DOCUMENTS

| | | | |
|---|---|---|---|
| 1,010,334 | 11/1911 | Wieck et al. | 74/584 |
| 1,214,506 | 2/1917 | Brasack | 198/609 X |
| 2,516,642 | 7/1950 | Murphy | 74/584 X |

FOREIGN PATENT DOCUMENTS 243549 12/1925 United Kingdom ................ 209/365 A Primary Examiner—Robert B. Reeves
Assistant Examiner—Douglas D. Watts
Attorney, Agent, or Firm—Fitch, Even & Tobin

[57] ABSTRACT

A shaker conveyor is disclosed which includes a conveyor trough supported for reciprocating movement and having drive means including a pull rod adapted to effect reciprocating movement of the conveyor in a manner to advance discrete particles therealong. The conveyor trough has a resiliently mounted discharge end adapted to withstand forces which might otherwise tend to damage the trough and pull rod, and the pull rod is adapted to undergo axial foreshortening when subjected to predetermined axial loading so as to prevent damage thereto.

5 Claims, 5 Drawing Figures

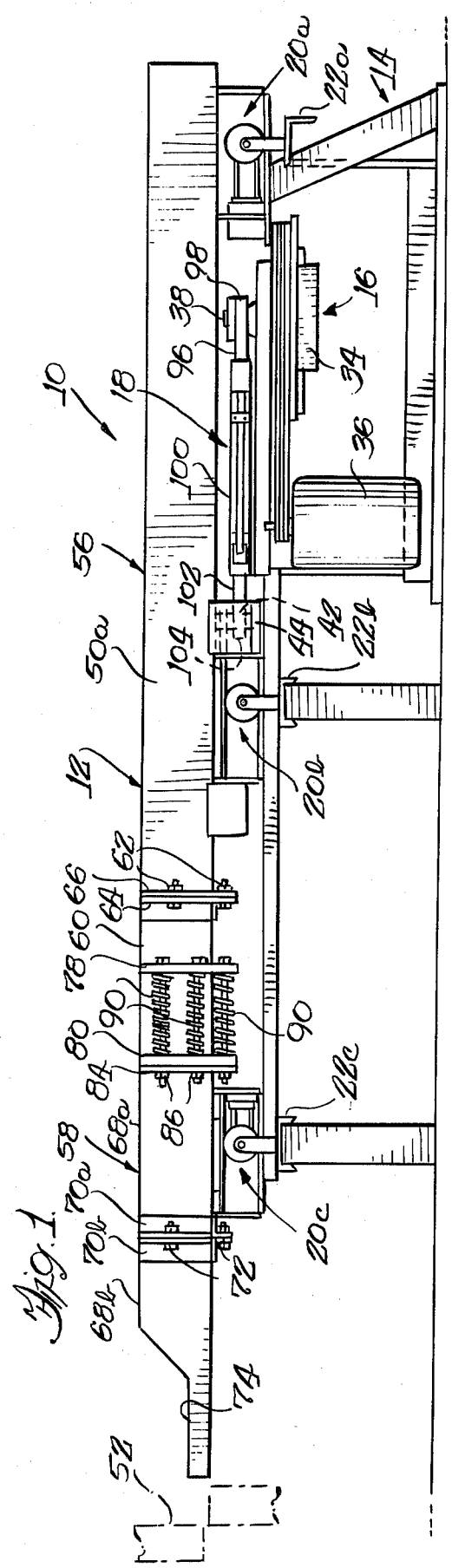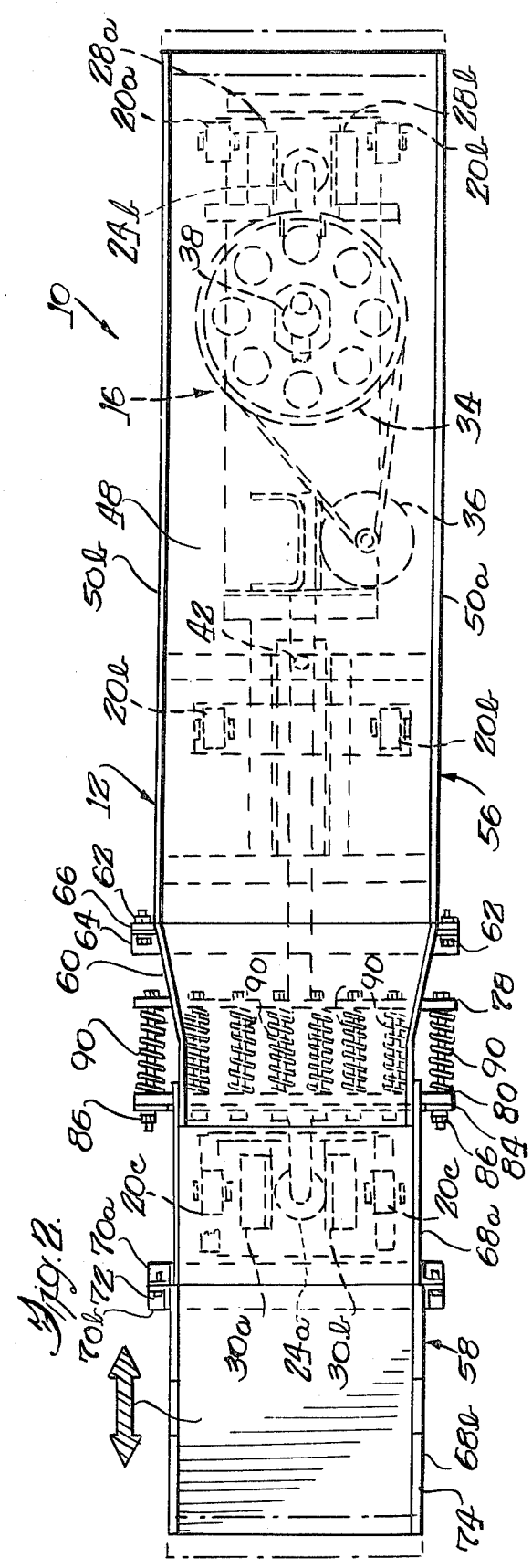

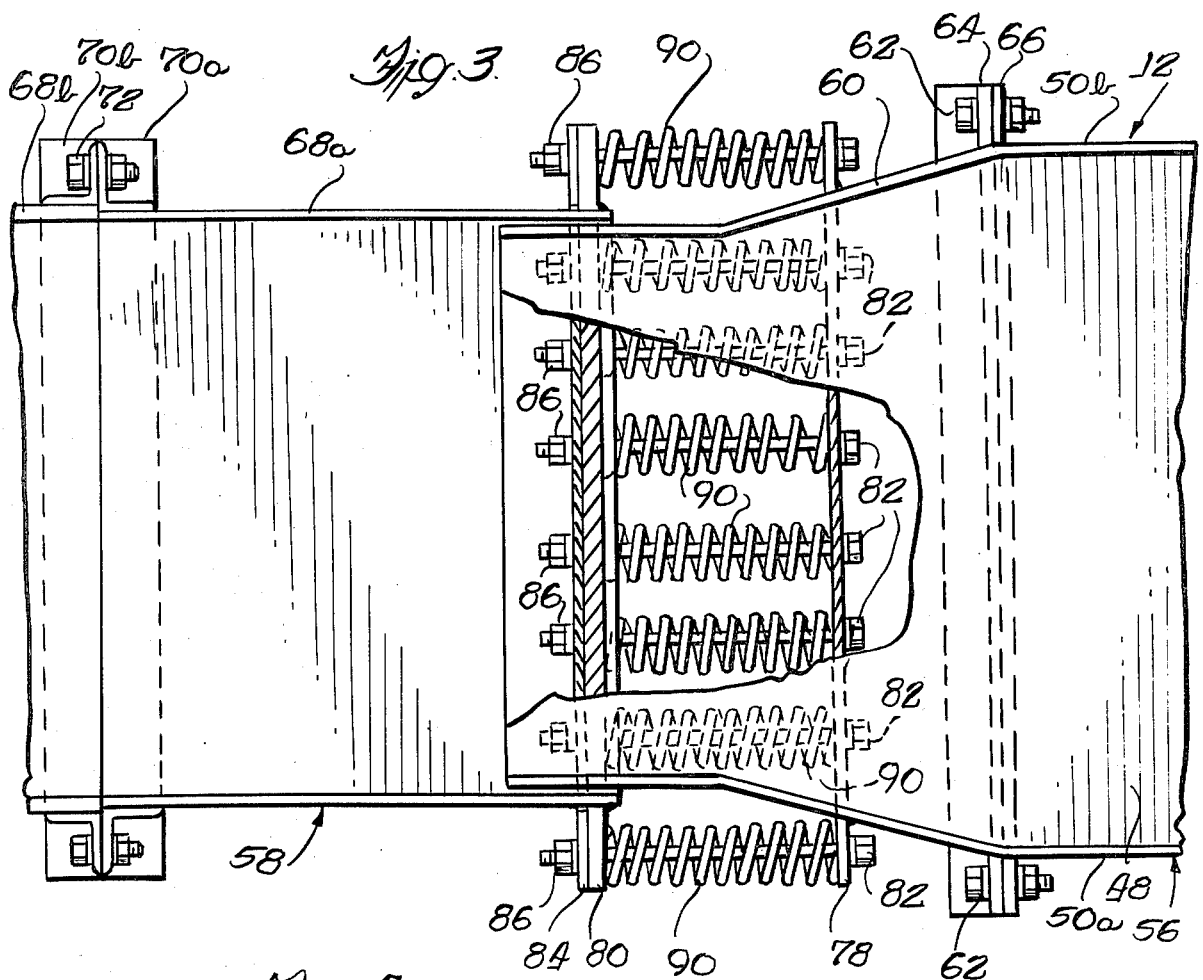
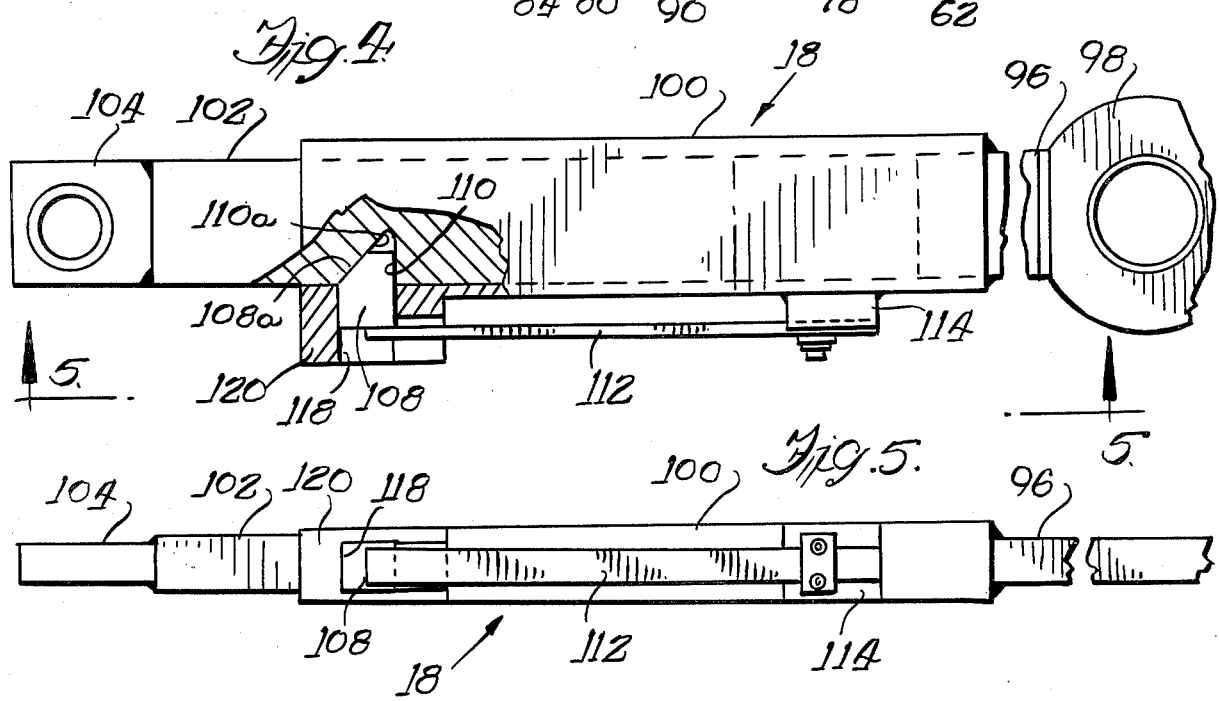

CONVEYOR TROUGH AND PULL ROD FOR A SHAKER CONVEYOR

The present invention relates generally to shaker conveyors for conveying particulate material and the like, along a reciprocable conveyor trough, and more particularly to a novel conveyor trough and pull rod adapted to withstand relatively large shock load forces without damage to the trough and pull rod.

It is known to employ shaker conveyors for advancing particulate material along a predetermined path. Conventionally, such shaker conveyors include a conveyor trough which is supported for longitudinal reciprocating movement and has operative association with a drive motor adapted to effect reciprocating movement of the trough in a manner to advance particulate material along the conveyor trough. An example of such a shaker conveyor is disclosed in U.S. Pat. No. 4,019,626, dated Apr. 26, 1977, and assigned to the assignee of the present invention.

In some industrial applications, such as in advancing relatively heavy discrete members or particles along the conveyor trough to a station at which an operation is performed on the particles, such as shearing them into particles of reduced size, the particles may be subjected to shearing forces acting substantially normal to the trough while the particles are still in contact with the conveyor trough. In such instances, load forces are generally applied to the discharge end of the conveyor trough which may have a force component acting generally normal to the conveying bed of the trough, and a force component acting longitudinally of the conveyor trough in a direction opposed to the advancing motion imparted to the trough by the driven pull rod. When the conveyor is subjected to such load forces, damage to either or both the conveyor trough and pull rod may result. There thus exists a need for conveyor trough and pull rod constructions which can withstand abnormal forces acting thereon without permanently damaging the conveyor trough or pull rod, whereby to increase the safety of the associated shaker conveyor.

One of the primary objects of the present invention is to provide a novel conveyor trough for use with a shaker conveyor or the like which has a flexible discharge end portion adapted to withstand relatively large impact forces without damaging the conveyor trough.

Another object of the present invention is to provide a novel pull rod for use in a shaker conveyor, which pull rod is adapted to undergo axial foreshortening when subjected to a predetermined axial force which might otherwise tend to damage the pull rod.

Still another object of the present invention is to provide a shaker conveyor having a novel conveyor trough and pull rod which combine to substantially increase the safety of the shaker conveyor when the conveyor trough is subjected to abnormally high impact forces at its discharge end.

A feature of the conveyor trough in accordance with the invention lies in the provision of a discharge end on the conveyor trough which is interconnected to the remaining portion of the trough through resilient means which permit movement of the discharge end when subjected to relatively large impact forces acting downwardly and/or longitudinally of the discharge end.

Another feature of the present invention lies in the provision of a novel pull rod having a pawl and detent arrangement operative to facilitate telescoping movement of first and second rod sections when subjected to a predetermined axial force, the pull rod being adapted to regain its normal length when the predetermined axial force is removed.

Further objects and advantages of the present invention, together with the organization and the manner of operation thereof, will become apparent from the following detailed description of the invention when taken in conjunction with the accompanying drawings wherein like reference numerals designate like elements throughout the several views, and wherein:

FIG. 1 is a side elevational view of a shaker conveyor employing a conveyor trough and pull rod constructed in accordance with the present invention;

FIG. 2 is a plan view of the shaker conveyor of FIG. 1;

FIG. 3 is a fragmentary plan view, on an enlarged scale, of the conveyor trough of FIG. 2 with portions broken away for clarity;

FIG. 4 is a plan view, foreshortened and on an enlarged scale, of the pull rod of FIG. 1 with portions broken away for clarity; and FIG. 5 is a side elevational view of the pull rod of FIG. 4, taken substantially along line 5—5 of FIG. 4 and looking in the direction of the arrows.

Referring now to the drawings, and in particular to FIG. 1, the present invention is illustrated, by way of example, as being embodied in a shaker conveyor indicated generally at 10. Very generally, the conveyor 10 includes a conveyor trough 12 supported in a generally horizontal position by base frame means 14 for reciprocating movement in the direction of its longitudinal axes. To effect reciprocating movement of the conveyor trough 12, drive means 16 are supported by the base frame 14 and are operatively connected to the conveyor trough through a pull rod 18 such that energizing the drive means 16 effects longitudinal reciprocating movement of the conveyor trough. The motion imparted to the conveyor trough 12 through actuation of the drive means 16 is operative to move discrete particles disposed on the conveyor trough in a predetermined direction longitudinally along the conveyor trough at a predetermined rate of speed as established by the drive means 16. By "discrete particles" is meant particles or elements of any size which can be supported by the conveyor trough 12 and moved along the trough by reciprocating motion imparted to the conveyor trough by the drive means 16 in a known manner.

The base frame means 14 and drive means 16 and their operative association with the conveyor trough 12 and pull rod 18 are of the type disclosed in the aforementioned U.S. Pat. No. 4,019,626, dated Apr. 26, 1977, which is incorporated herein by reference. The conveyor trough 12 is supported on pairs of laterally spaced vertical guide rollers 20a, 20b, and 20c, each pair of guide rollers being mounted on an associated transverse beam 22a, b and c. The conveyor trough 12 is restrained from lateral movement relative to its longitudinal axis by forward and rear guide rollers 24a and 24b (FIG. 2) supported in horizontal planes intermediate the pairs of laterally spaced support rollers 20a and 20c so as to be captured between spaced pairs of angles 28a, b and 30a, b secured to the lower surface of the conveyor trough for cooperation with the corresponding rollers 24a, b.

The drive means 16 includes a drive mechanism 34 supported on the base frame 14 and having a belt drive connection to a suitable electric drive motor 36 as best seen in FIG. 1. The drive mechanism 34 may be of the type disclosed in the aforemention U.S. Pat. No. 4,019,626 and has an output crankshaft 38 to which one end of the pull rod 18 is connected in a manner to effect reciprocating movement of the pull rod in a plane substantially parallel to the longitudinal axis of the conveyor trough 12 upon actuation of the drive mechanism as is known. The end of the pull rod 18 opposite its connection to the output crankshaft 38 is pivotally connected to the conveyor trough through a pivot pin 42 secured to the lower surface of the conveyor trough through a mounting bracket 44 so that the axis of the pivot pin 42 is normal to and intersects the longitudinal center line of the conveyor trough 12.

The conveyor trough 12 conventionally has a generally U-shaped transverse sectional configuration defined by a horizontally disposed bottom wall 48 having upstanding side walls 50a and 50b disposed laterally of the longitudinal axes of the shaker conveyor and preferably formed integral with the bottom wall 48. The U-shaped conveyor trough thus facilitates movement of discrete particles therealong ranging in size from relatively large heavy metallic pieces to small lightweight particles of coal or the like.

In certain applications of the shaker conveyor 10, such as when employed to convey relatively heavy metallic articles or pieces of substantial size to a shear as indicated in phantom at 52 in FIG. 1 for shearing the conveyed pieces into smaller size pieces, it sometimes happens that the piece being sheared is still in partial engagement with the discharge end of the conveyor trough so that an impact force is transmitted to the discharge end of the conveyor trough. This impact force may create a force component acting downwardly on the end of the conveyor trough generally perpendicular to the bottom wall 48 and a force component acting longitudinally of the conveyor trough in a direction to resist advancing movement thereof under the action of the pull rod 18. While the conveyor trough 12 is of suitable strength to withstand substantial forces acting on the discharge end thereof, relatively large impact forces as may be experienced during shearing of pieces engaging the conveyor trough, may cause damage to the conveyor trough and associated pull rod 18.

In accordance with one important feature of the present invention, the conveyor trough 12 is comprised of two conveyor trough sections, a first section 56 defining the primary or rearward end of the conveyor trough, and a second section 58 defining the discharge or forward end of the conveyor trough. The conveyor trough section 56 is supported on the pairs of guide rollers 20a and 20b so as to overlie the drive means 16 and generally constitutes the main portion of the conveyor trough. The conveyor trough section 56 has the pivot pin 42 and associated support bracket 44 secured to its bottom wall 48 for connection to the pull rod 18. In the illustrated embodiment, the conveyor trough section 56 terminates at its forward end in a discharge throat section 60 which may be formed separate from section 56 and secured axially thereto by bolts 62 secured through a transverse angle bar 64 on throat section 60 and a transverse flange 66 on the adjacent end of section 56. The lateral upstanding side walls of the throat section 60 taper inwardly toward the longitudinal axis of the conveyor trough from the side walls 50a, b of section 56 and are parallel at their forward ends.

The second or discharge end section 58 of conveyor trough 12 is axially aligned with the first trough section 56 and has partial telescoping relation with the discharge throat 60 of the trough section 56. The trough discharge end section 58 may be made of two portions 68a and 68b which are connected in axial aligned relation through angle bars 70a and 70b and bolts 72. Material conveyed along the conveyor trough 12 is discharged from the end portion 68b of the trough section 58 which, for this purpose, may be made of a heavier gauge material and has its upstanding side walls recessed at 74 to provide clearance for the shear knife carrier. It is seen from FIG. 1 that the support rollers 20c directly support the forward conveyor trough discharge section 58.

The discharge end section 58 of the conveyor trough 12 is connected to the conveyor trough section 56 through resilient connection means in a manner to permit pivotal movement of the forward trough section 58 from its normal axial alignment with the rearward conveyor trough section 56 and also permit longitudinal movement of the forward conveyor trough section 68 relative to the rearward conveyor trough section. To this end, a connecting plate 78 is mounted on the forward end of the conveyor throat section 60 so as to lie in a plane transverse to the longitudinal axis of the conveyor trough. The plate 78 is generally U-shaped so as to extend below and across the bottom wall 48 of the conveyor trough and laterally outwardly from the upstanding side walls thereof. A similarly shaped second connecting plate 80 is mounted on the rearward end of the conveyor trough section 58 in similar fashion to the connecting plate 78 and is interconnected to plate 78 through a plurality of bolts 82 which extend through axially aligned pairs of openings in the plates 78 and 80 such that the axes of the bolts are parallel to the longitudinal axis of the conveyor trough.

Preferably, a generally U-shaped bar plate 84 is interposed between nuts 86 on the bolts 82 and the connecting plate 80. A coil compression spring 90 is mounted coaxially over each of the bolts 82 and has its opposite ends disposed against the opposing surfaces of the connecting plates 78 and 80 so as to normally bias the connecting plates and the associated conveyor trough sections 56 and 58 to maximum extended length as determined by the length of the bolts 82. In this manner, when the conveyor trough discharge end section 58 is subjected to an external force which establishes a force component of predetermined magnitude acting downwardly on the discharge end section and also a force component of predetermined magnitude acting generally longitudinally of the discharge end section, the resilient mounting springs 90 permit downward pivotal movement of the forward discharge end section as well as longitudinal telescoping movement thereof relative to the conveyor trough section 56. With the discharge end section of the conveyor being adapted for such pivotal and longitudinal movement relative to the rearward conveyor section 56, axial loading of the pull rod 18 due to impact forces acting on the discharge end section are substantially reduced. It will be appreciated that the predetermined magnitude of forces which effect movement of the discharge end of the conveyor trough are established by selection of the springs 90.

To further increase the safety of the shaker conveyor 10 and prevent damage to the pull rod 18, another important feature of the invention lies in the provision of a pull rod which permits telescoping thereof when subjected to a predetermined axial impact force. With particular reference to FIGS. 4 and 5, the pull rod 18 comprises a first rod link portion or section 96 which may have a generally rectangular transverse cross sectional configuration and is connected at one end to an annular bearing housing 98 of conventional design which facilitates connection of the pull rod to the output crankshaft 38 on the rotary drive mechanism 34. The pull rod portion 96 has a tubular sleeve portion 100, also of generally rectangular transverse cross section, secured thereon which is adapted to receive a second pull rod section 102 in axial telescoping relation therein so as to accommodate relative longitudinal extension and retraction of the overall length of the pull rod. The end of the pull rod section 102 opposite its telescoping connection with the tubular sleeve 100 is connected to a bearing block 104 which facilitates pivotal connection of the pull rod to the pivot pin 42.

The pull rod section 96 carries pawl means in the form of a pawl 108 for releasable cooperation with a detent or recess 110 in the pull rod section 102 so as to maintain the pull rod sections 96 and 102 in normal fixed axial relation to each other but which facilitates telescoping shortening of the normal overall length of the pull rod when subjected to a predetermined axial force. To this end, the pawl 108 is suitably secured to one end of a flat spring bar 112 which has its opposite end mounted on a support block 114 which in turn is secured to the tubular sleeve 100 on the pull rod section 96. The pawl 108 is generally rectangular in transverse cross section and is axially slidably guided within a suitably configured bore 118 in a guide block 120 secured to the tubular sleeve 100 in longitudinal spaced relation from the support block 114. The pawl 108 and cooperating recess 110 have mutually engageable tapered cam surfaces 108a and 110a, respectively, which are inclined in a direction to effect outward cammed movement of the pawl from the recess when the pull rod portion 102 is subjected to a predetermined axial force tending to foreshorten the pull rod and of sufficient magnitude to overcome the force of spring bar 112 acting to retain the pawl 108 within the recess 110.

It will be appreciated that the spring bar 112 is selected to maintain the pawl 108 within the detent or recess 110 so that the longitudinal length between the end connections 98 and 104 on the pull rod remains fixed under normal operating load conditions. Should the pull rod be subjected to an axial load which would otherwise be of sufficient magnitude to bend the pull rod, as from a force acting on the discharge end 58 of the conveyor trough 12 having a force component acting in a direction opposing forward driving movement of the pull rod and of a magnitude sufficient to substantially resist or prevent such driving movement of the pull rod, the pawl 108 will release from the recess 110 and allow telescoping movement of the pull rod sections 96 and 102 without damaging the pull rod or associated mounting bearings and support shafts. After release of the impact force which caused telescoping of the pull rod, the conveyor trough and associated end section 102 of the pull rod will remain substantially stationary until a rearward stroke of the pull rod section 96 causes the pawl 108 to again enter the recess 110 and reinstate driving reciprocating movement of the conveyor trough.

Thus, in accordance with the present invention, a conveyor trough is provided which can withstand external force loads acting on its discharge end which might otherwise tend to damage the conveyor trough and associated pull rod 18. Additionally, the pull rod is adapted for telescoping shortening through safety release means in the form of the pawl 108 and recess 110 which normally cooperate to maintain the two pull rod sections 96 and 102 in predetermined axial positions relative to each other, but which effect telescoping of the pull rod when subjected to a predetermined axial impact force.

While preferred embodiments of the invention has been illustrated and described, it will be understood that those skilled in the art that changes and modifications may be made therein without departing from the invention in its broader aspects.

Various features of the invention are defined in the following claims.

What is claimed is:

1. In a shaker conveyor, the combination comprising a conveyor trough defining a discharge end, means supporting said conveyor trough for longitudinal reciprocating movement, and drive means including a drive motor and a pull rod interconnecting said drive motor to said conveyor trough so as to effect reciprocating movement of said trough upon actuation of said drive motor to advance discreet particles therealong in the direction of said discharge end, said drive motor and pull rod being operative to effect movement of said conveyor trough in the direction of said discharge end at a first velocity during which said pull rod is in axial compression followed by reverse movement of said trough at a substantially increased velocity during which said pull rod is in axial tension, said conveyor trough having a first trough section defining forward and rearward ends and a second trough section substantially axially aligned with said first trough section and defining said discharge end and having a receiving end disposed adjacent said forward end of said first trough sections so as to receive particles therefrom, resilient means interconnecting said first and second trough sections in a manner to facilitate both pivotal movement of said second trough section from its said axially aligned relation with said first trough section and longitudinal telescoping movement relative to said first trough section when said discharge end of said second trough section is subjected to a predetermined impact force, said pull rod having first and second axially aligned sections adapted for mutually supporting telescoping relation, and a pawl carried by one of said pull rod sections for releasable interengagement with the other of said rod sections so as to normally maintain said first and second rod sections in predetermined relatively fixed axial relation, said pawl and said other of said rod sections being cooperative to prevent release of said pawl and thereby prevent elongation of said pull rod during movement of said trough in said reverse direction at said increased velocity with said pull rod in axial tension, said pawl being adapted for disengagement from said other of said rod sections to facilitate axial telescoping of said first and second rod sections when subjected to a predetermined axial force therebetween in a direction tending to shorten the overall length of the pull rod.

2. In a shaker conveyor having a conveyor trough defining a discharge end, means supporting said conveyor trough for longitudinal reciprocating movement, and drive means including a drive mechanism and a pull rod interconnecting said drive mechanism to said conveyor trough so as to effect reciprocating movement of said trough upon energizing said drive mechanism, said drive mechanism and said pull rod being operative to effect movement of said conveyor trough in the direction of said discharge end at a first velocity during which said pull rod is in axial compression followed by reverse movement of said trough at a substantially increased velocity during which said pull rod is in axial tension, the improvement wherein said pull rod has first and second axially aligned pull rod sections adapted for mutually telescoping relation, a pawl carried by one of said pull rod sections for releasable interconnection with the other of said rod sections so as to normally maintain said first and second rod sections in predetermined axial relation, said pawl and said other of said rod sections being cooperative to prevent release of said pawl and thereby prevent elongation of said pull rod during movement of said trough in said reverse direction at said increased velocity with said pull rod in axial tension, said pawl being adapted for disengagement from said other of said rod sections to facilitate axial telescoping of said first and second rod sections when the pull rod is subjected to a predetermined axial force therebetween in a direction tending to shorten the overall length of said pull rod during movement of said trough in said first direction.

3. The improvement as defined in claim 1 or 2 including means mounted on said one of said pull rod sections and supporting said pawl in a manner to bias said pawl into interengagement with the other of said rod sections so as to maintain said pawl in interengagement with said other rod section until said pull rod is subjected to said predetermined axial force.

4. The improvement as defined in claim 1 or 2 wherein said other of said pull rod sections has a recess formed in its peripheral surface, said pawl being pawl carried by said one of said pull rod sections and adapted to be received within said recess so as to normally maintain said pull rod sections in said predetermined axial relation, said pawl and recess being mutually cooperable to effect release of said pawl from said recess when said pull rod sections are subjected to said predetermined axial force tending to shorten the length of said pull rod, said one of said pull rod sections having guide block means thereon guiding said pawl in substantially transverse movement relative to said recess.

5. The improvement as defined in claim 4 wherein said pawl and recess have mutually cooperable planar camming surfaces formed thereon adapted to effect outward movement of the pawl from said recess when said pull rod is subjected to said predetermined axial force tending to shorten the length of said pull rod.

* * * * *